(12) United States Patent
Bales

(10) Patent No.: US 11,267,075 B2
(45) Date of Patent: Mar. 8, 2022

(54) BY-PRODUCT REMOVAL DEVICE FOR LASER WELDING

(71) Applicant: United Technologies Corporation, Farmington, CT (US)

(72) Inventor: Daniel A. Bales, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 330 days.

(21) Appl. No.: 16/414,442

(22) Filed: May 16, 2019

(65) Prior Publication Data

US 2020/0361031 A1 Nov. 19, 2020

(51) Int. Cl.
*B23K 26/142* (2014.01)
*B23K 26/28* (2014.01)
*B23K 101/00* (2006.01)
*B23K 103/14* (2006.01)

(52) U.S. Cl.
CPC ............ *B23K 26/142* (2015.10); *B23K 26/28* (2013.01); *B23K 2101/001* (2018.08); *B23K 2103/14* (2018.08)

(58) Field of Classification Search
CPC ............... B23K 36/142; B23K 26/28; B23K 2101/001; B23K 2103/14
USPC ............ 219/121.45, 121.63, 121.67, 121.84, 219/121.86
See application file for complete search history.

(56) References Cited

U.S. PATENT DOCUMENTS

| | | | |
|---|---|---|---|
| 3,866,398 A * | 2/1975 | Vernon, Jr. .......... | B23K 26/142 134/1.3 |
| 4,027,137 A * | 5/1977 | Liedtke ................ | B23K 26/123 219/121.7 |
| 4,121,085 A | 10/1978 | Diemer et al. | |
| 4,724,299 A * | 2/1988 | Hammeke ............. | B05B 7/1486 219/121.6 |
| 5,043,548 A * | 8/1991 | Whitney ............... | B05B 7/1486 219/121.47 |
| 5,418,350 A * | 5/1995 | Freneaux ................ | B05B 7/228 219/121.64 |

(Continued)

FOREIGN PATENT DOCUMENTS

| | | |
|---|---|---|
| DE | 102016116659 A1 | 3/2018 |
| JP | 2012091198 A | 5/2012 |

OTHER PUBLICATIONS

EP search report for EP20172135.4 dated Oct. 29, 2020.

*Primary Examiner* — Thien S Tran
(74) *Attorney, Agent, or Firm* — Getz Balich LLC

(57) ABSTRACT

A laser welding by-product removal device comprises a housing that includes distal and proximate ends separated along a central axis by a peripheral sidewall. A first plenum circumscribes the peripheral sidewall at the proximate housing end and includes a gas inlet and a first plenum base surface that includes a plurality of gas outlet holes. A second plenum circumscribes the peripheral sidewall between the first plenum and the distal housing end, where the second plenum includes a second plenum base surface, radially inner and outer sidewalls that extend axially distal from the second plenum base surface. The second plenum includes a top surface extending between the radially inner and outer sidewalls, and a by-product outlet in the top surface, where at least one of the second plenum base surface and the radially outer sidewall includes a plurality of by-product inlet holes.

16 Claims, 2 Drawing Sheets

(56) References Cited

U.S. PATENT DOCUMENTS

| | | | | |
|---|---|---|---|---|
| 5,768,740 A * | 6/1998 | McBride | ............... | A47L 7/0052 |
| | | | | 15/301 |
| 6,019,599 A * | 2/2000 | Volcker | ................... | B08B 15/04 |
| | | | | 433/29 |
| 7,259,353 B2 * | 8/2007 | Guo | ................... | B23K 26/1476 |
| | | | | 219/121.63 |
| 7,334,971 B2 * | 2/2008 | Benedetti | ........... | B23Q 11/0046 |
| | | | | 408/67 |
| 8,642,919 B2 * | 2/2014 | Hogan | .................. | B23K 26/127 |
| | | | | 219/121.67 |
| 8,809,732 B2 * | 8/2014 | Sykes | ................... | B23K 26/146 |
| | | | | 219/121.68 |
| 10,010,976 B2 | 7/2018 | Chanteloup et al. | | |
| 10,201,875 B2 | 2/2019 | Liebl | | |

\* cited by examiner

BY-PRODUCT REMOVAL DEVICE FOR LASER WELDING

BACKGROUND OF THE INVENTION

1. Technical Field

The present disclosure relates to laser welding, more particularly to a device for removing by-products, such as for example, soot, created during laser welding.

2. Background Information

Hollow titanium fan blade construction uses a hot formed 3-D, twisted sheet metal cover (e.g., a first component) that is laser welded to a 3-D, twisted forging (e.g., a second component) that has been semi-finished machined externally with finished machined internal cavities connected by narrow ribs for reduced weight, but maintaining structural integrity. Once the sheet metal cover is fitted into the blade body's recess, it is first welded peripherally, then welded at strategic locations inboard of the peripheral weld. To ensure laser welding is near-perpendicular to the particular surface location of the first component to be welded to the second component, articulation occurs with both the blade's sub-fixture and the independent robot arm to which the laser is attached. Since the surface to be welded is a twisted shape (e.g., approximately 32" length by 13" in width), small variations in height occur as the laser tracks to weld the cover's periphery, and tracks to weld the cover to the internal circular ribs and racetracks. Externally positioned clamps secure the blade body to the base fixture and strategically clamp the cover to the blade body, such that tack welds can be made at pre-determined locations around the periphery that are between the external clamps (e.g., every two inches around the cover periphery). FIG. 1 illustrates a portion of a gas turbine engine fan blade 100 in an intermediate state of manufacture, where a cover (not shown) has not yet been welded to the fan blade 100. Referring to FIG. 1, a cover (not shown) is forced tightly against interior ribs 102 of the twisted forging of the blade 100, as well as between peripheral tack weld locations 104.

Laser tack welding of cavity-back hollow titanium fan blades is generally performed within an argon environment. When a cavity-back hollow titanium fan blade is properly positioned below the surface of a 5-sided open-top container (e.g., shoe-box-like) and filled with argon, the argon displaces any air within the open container, simultaneously filling the cavities of the cavity-back fan blade prior to the cover being positioned onto the blade. If a continuous flow of argon enters the open-top container, the fan blade remains submerged in argon free from air throughout the welding of the cover onto the blade, thus trapping argon within the sealed internal cavities. This process prevents oxidation of the hollow fan blade's internal surfaces during welding and during subsequent stress relief. However, laser welding a metallic alloy (titanium in this situation) results in by-products such as metallic vapors being generated and the by-products (e.g., soot) rise to the top of the argon bath that protects the fan blade.

What is needed is a device for providing the argon gas, as well as removing by-products such as titanium vapors/soot during the welding process.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a laser welding by-product removal device. The device comprises a housing that includes a distal housing end and a proximate housing end separated along a central axis by a peripheral sidewall, and a housing recess at the proximate housing end and extending along the central axis toward the distal housing end. A first circumferential plenum circumscribes the peripheral sidewall at the proximate housing end and includes a gas inlet and a first circumferential plenum base surface that includes a plurality of gas outlet holes. A gas source is connected to the gas inlet. A second circumferential plenum circumscribes the peripheral sidewall between the first circumferential plenum and the distal housing end, where the second circumferential plenum includes a second circumferential plenum base surface, radially inner and radially outer sidewalls that extend axially distal from the second circumferential plenum base surface. The second circumferential plenum also includes a top surface that extends between the radially inner and radially outer sidewalls at a distal end of the second circumferential plenum, and a by-product outlet in the top surface, where at least one of the second circumferential plenum base surface and the radially outer sidewall includes a plurality of by-product inlet holes. A vacuum source is connected to the by-product outlet to draw flow through the by-product inlet holes and through the by-product outlet.

The first circumferential plenum may be removably and replaceably attached to the peripheral sidewall.

The second circumferential plenum may be removably and replaceably attached to the peripheral sidewall.

The second circumferential plenum may include an axial bore that a roller ball clamp housing passes through.

The radially inner and radially outer sidewalls may be cylindrical.

The radially inner and radially outer sidewalls may be conical such that the second circumferential plenum base surface is radially wider than the top surface.

The plurality of by-product inlet holes may be arranged as an array.

The laser welding by-product removal device may include a source that provides a coherent beam of light that exits the housing recess at the proximate housing.

Aspects of the disclosure are also directed to a laser welding by-product removal device, comprising a housing that includes a distal housing end and a proximate housing end separated along a central axis by a peripheral sidewall, and a housing recess at the proximate housing end and extending along the central axis toward the distal housing end. The device includes a first plenum at the proximate housing end, and that includes a gas inlet and a first plenum base surface that includes a plurality of gas outlet holes. A gas source is connected to the gas inlet and provides a gas to the first plenum. A second plenum circumscribes the peripheral sidewall between the first plenum and the distal housing end, where the second plenum includes (i) a second plenum base surface, (ii) radially inner and radially outer sidewalls that extend axially distal from the second circumferential plenum base surface, (iii) a top surface that extends between the radially inner and radially outer sidewalls at a distal end of the second plenum, and (iv) a by-product outlet in at least one of the top surface and the radially outer sidewalls. At least one of the second circumferential plenum base surface and the radially outer sidewall includes a plurality of by-product inlet holes. A vacuum source is connected to the by-product outlet to draw flow through the by-product inlet holes and through the by-product outlet.

The first plenum may be removably and replaceably attached to the peripheral sidewall.

The second plenum may be removably and replaceably attached to the peripheral sidewall.

The second plenum may include an axial bore that a roller ball clamp housing passes through.

The radially inner and radially outer sidewalls may be cylindrical.

The plurality of by-product inlet holes may be arranged as an array.

The laser welding by-product removal device may include a source that provides a coherent beam of light that exits the housing recess at the proximate housing.

The peripheral sidewall may comprise a tubular cross section.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 2:
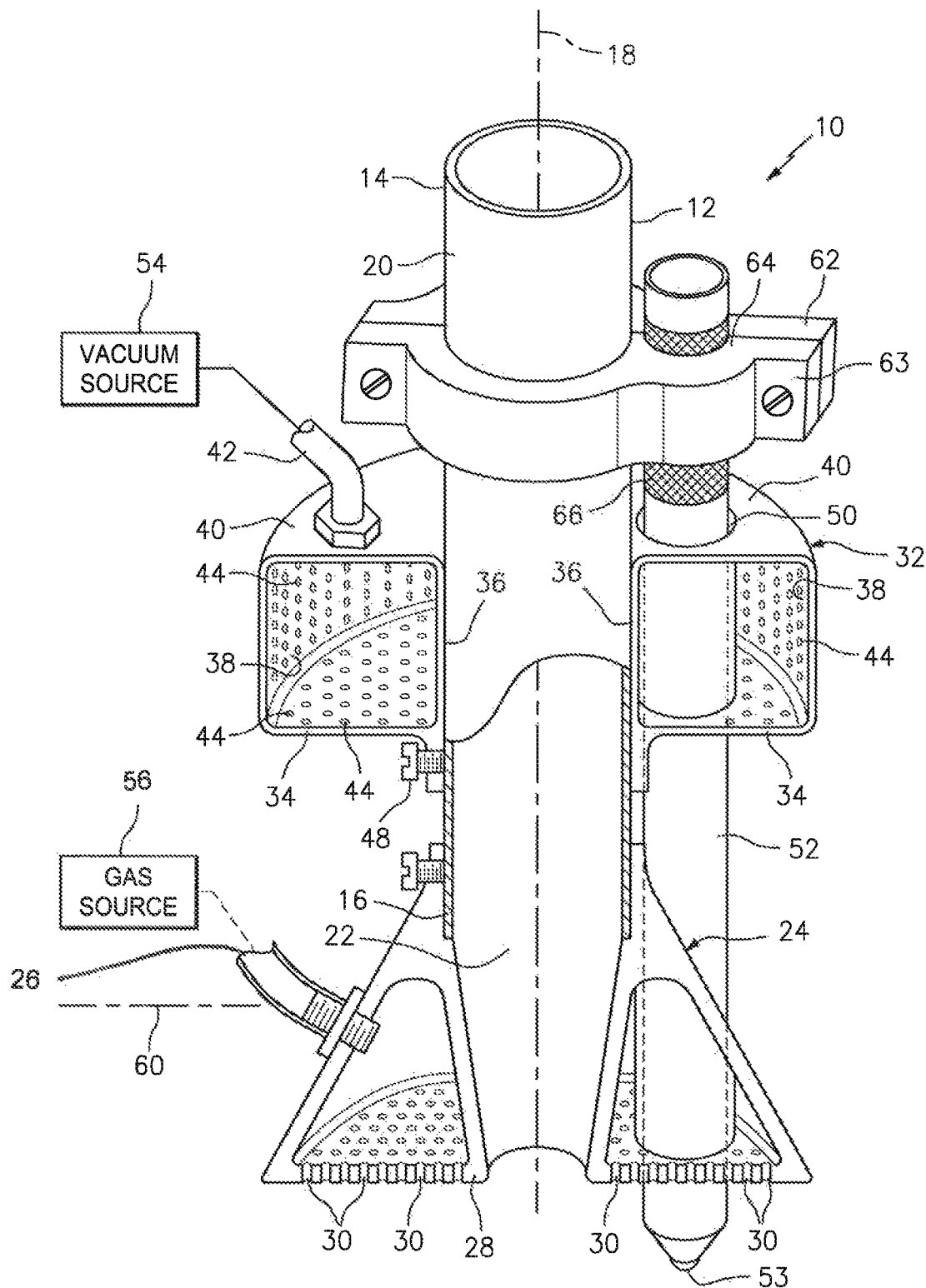
FIG. 2 is a pictorial illustration of a laser welding by-product removal device.

FIG. 2 is a pictorial illustration of a laser welding by-product removal device 10. The device 10 includes a housing 12 (e.g., a metallic tube) comprising a distal housing end 14 and proximate housing end 16 separated along a central axis 18 by a peripheral sidewall 20. The peripheral sidewall may comprise a tubular cross section. A housing recess 22 at the proximate housing end 16 extends along the central axis 18 toward the distal housing end 14. The housing 12 may be attached to a fiber optic laser head (not shown).

Figure 1:
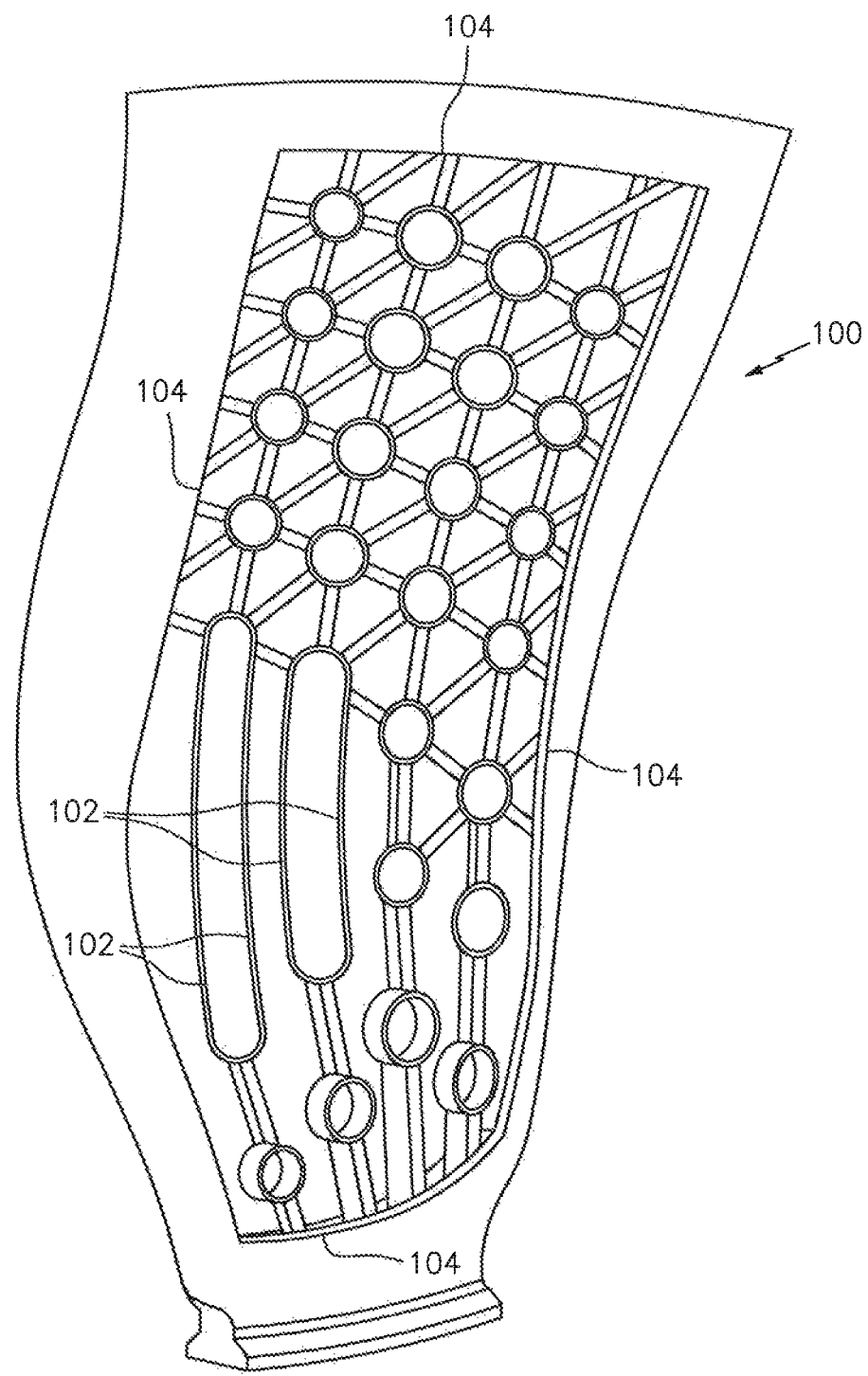
FIG. 1 illustrates a portion of a gas turbine engine fan blade in an intermediate state of manufacture, where a cover (not shown) has not yet been welded to the fan blade.

A first circumferential plenum 24 circumscribes the peripheral sidewall 20 at the proximate housing end 16, and includes a gas inlet 26 and a first circumferential plenum base surface 28 that includes a plurality of gas outlet holes 30. The gas inlet 26 may receive a gas (e.g., argon), which is distributed via the gas outlet holes 30 to establish a cover of argon gas adjacent to the component being laser welded. In one embodiment, the component may be a cavity-back hollow titanium fan blade (FIG. 1). During the laser welding process, the fan blade remains submerged in argon, free from air throughout welding of the blade's cover onto the blade, thus trapping argon within the sealed internal cavities.

The first circumferential plenum 24 may be removably and replaceably attached to the peripheral sidewall 20, for example via one or more radially threaded fasteners. In one embodiment the plenum 24 may be conically shaped as shown in FIG. 2. However, it is contemplated that the first circumferential plenum may be configured in a number of different ways. For example, it may be cylindrical, rectangular, octagonal, polygonal, et cetera.

The device 10 also includes a second circumferential plenum 32 that circumscribes the peripheral sidewall 20 between the first circumferential plenum 24 and the distal housing end 14. The second circumferential plenum 32 includes a second circumferential plenum base surface 34 and radially inner and radially outer sidewalls 36, 38. The sidewalls extend axially from the second circumferential plenum base surface 34. A top surface 40 extends between the radially inner and radially outer sidewalls 36, 38 at a distal end of the second circumferential plenum 32. One or more by-product outlets 42 may be located on the top surface 40, where at least one of the base surfaces 34 and the radially outer sidewall 38 includes a plurality of by-product inlet holes 44. In the embodiment of FIG. 2 the base surface 34 and the radially outer sidewall 38 each include an array of the by-product inlet holes 44. However, it is contemplated that the by-product inlet holes 44 may be arranged in a number of ways to provide the desired inlet paths for ambient by-products created by the laser welding process. For example, the holes 44 may be arranged in one or both of the base surface 34 and the outer sidewall 38.

The second circumferential plenum 32 may be configured in a number of different ways. For example, as shown in the embodiment of FIG. 2, the radially inner and radially outer sidewalls 36, 38 may be cylindrical. However, it is contemplated that the second circumferential plenum may be configured in a number of other different ways including rectangular, octagonal, polygonal, conical, et cetera.

The second circumferential plenum 32 may be removably and replaceably attached to the peripheral sidewall 20, for example via radial fastener 48. In addition, the second circumferential plenum 32 may include an axial bore 50 that a roller ball clamp housing 52 may pass through. The roller ball clamp housing 52 includes roller ball 53 that forces the blade cover against the twisted forged component of the blade to which it is tack welded to. While FIG. 2 illustrates a single rollerball clamp housing 52, it is contemplated that a plurality of such housings and corresponding roller balls may be located around the second circumferential plenum 32 to provide addition clamping of the cover during welding.

A vacuum source 54 (i.e., a pneumatic suction device) is connected to the by-product outlet 42 to draw flow through the by-product inlet holes 44 and then through the by-product outlet 42. A gas source 56 is connected to the gas inlet 26.

Referring still to FIG. 2, in operation a laser beam travels from the laser head (not shown) through the center of the housing 12, then exits at the housing at the proximate end 16. A high purity argon gas exits the first circumferential plenum 24 at some distance (e.g., 0.75 inches) above the fan blade's surface being welded, but perhaps about 2 to 4 inches below an interface 60 separating the bath of argon from the air-filled room in which welding is occurring. The first circumferential plenum 24 may be used to provide cover gas (e.g., argon) for many applications and for applications where concern for removing welding vapors does not exist.

The second circumferential plenum 32 vacuums off by-products (e.g., welding vapors/soot) that occurs during the fan blade welding. The plenum 32 is positioned axially above the first circumferential plenum 24 that delivers the argon gas, and at a position just above argon/air interface 60. The first circumferential plenum 24 delivers the argon cover gas for welding, while the second circumferential plenum 32 vacuums off (e.g., continuously) by-products being generated during welding and residing above the height of the argon. It should be noted that the second plenum's vertical position may be adjusted via the fastener 48. Alternatively or in addition to the fastener, an interference fit may be utilized between the circumferential plenum's inside diameter and the housing outer diameter to position (i.e., removably and replaceably) the plenum on the peripheral sidewall). This enables optimizing such position for the specific application.

The laser welding by-product removal device 10 may also include a first clamp element 62 and a second clamp element 63 each having a cooperating indentation 64 within which the clamp housing 52 may be axially secured (e.g., via a knurled section 66).

It is contemplated that the number of inlet and outlet holes illustrated in FIG. 2 may be increased or decreased, may be uniformly or non-uniformly shaped, and/or may be of uniform or non-uniform sizes (e.g., cross-sectional area).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A laser welding by-product removal device, comprising:
    a housing comprising a distal housing end and a proximate housing end separated along a central axis by a peripheral sidewall, and a housing recess at the proximate housing end and extending along the central axis toward the distal housing end;
    a first circumferential plenum that circumscribes the peripheral sidewall at the proximate housing end and includes a gas inlet and a first circumferential plenum base surface that includes a plurality of gas outlet holes;
    a second circumferential plenum that circumscribes the peripheral sidewall between the first circumferential plenum and the distal housing end, where the second circumferential plenum includes a second circumferential plenum base surface, radially inner and radially outer sidewalls that extend axially distal from the second circumferential plenum base surface, and a top surface that extends between the radially inner and radially outer sidewalls at a distal end of the second circumferential plenum, a by-product outlet in the top surface, where at least one of the second circumferential plenum base surface and the radially outer sidewall includes a plurality of by-product inlet holes;
    a vacuum source that is connected to the by-product outlet to draw flow through the by-product inlet holes and through the by-product outlet; and
    a gas source that is connected to the gas inlet.

2. The laser welding by-product removal device of claim 1, where the first circumferential plenum is removably and replaceably attached to the peripheral sidewall.

3. The laser welding by-product removal device of claim 1, where the second circumferential plenum is removably and replaceably attached to the peripheral sidewall.

4. The laser welding by-product removal device of claim 1, where the second circumferential plenum includes an axial bore that a roller ball clamp housing passes thorough.

5. The laser welding by-product removal device of claim 1, where the radially inner and radially outer sidewalls are cylindrical.

6. The laser welding by-product removal device of claim 1, where the radially inner and radially outer sidewalls are conical such that the second circumferential plenum base surface is radially wider than the top surface.

7. The laser welding by-product removal device of claim 5, where the plurality of by-product inlet holes are arranged as an array.

8. The laser welding by-product removal device of claim 5, further comprising a laser source that provides a coherent beam of light that exits the housing recess at the proximate housing end.

9. A laser welding by-product removal device, comprising:
    a housing comprising a distal housing end and a proximate housing end separated along a central axis by a peripheral sidewall, and a housing recess at the proximate housing end and extending along the central axis toward the distal housing end;
    a first plenum at the proximate housing end, and that includes a gas inlet and a first plenum base surface that includes a plurality of gas outlet holes;
    a second plenum that circumscribes the peripheral sidewall between the first plenum and the distal housing end, where the second plenum includes (i) a second plenum base surface, (ii) radially inner and radially outer sidewalls that extend axially distal from the second plenum base surface, (iii) a top surface that extends between the radially inner and radially outer sidewalls at a distal end of the second plenum, and (iv) a by-product outlet in at least one of the top surface and the radially outer sidewalls, where at least one of the second plenum base surface and the radially outer sidewall includes a plurality of by-product inlet holes;
    a vacuum source that is connected to the by-product outlet to draw flow through the by-product inlet holes and through the by-product outlet; and
    a gas source that is connected to the gas inlet and provides a gas to the first plenum.

10. The laser welding by-product removal device of claim 9, where the first plenum is removably and replaceably attached to the peripheral sidewall.

11. The laser welding by-product removal device of claim 10, where the second plenum is removably and replaceably attached to the peripheral sidewall.

12. The laser welding by-product removal device of claim 9, where the second plenum includes an axial bore that a roller ball clamp housing passes thorough.

13. The laser welding by-product removal device of claim 11, where the radially inner and radially outer sidewalls are cylindrical.

14. The laser welding by-product removal device of claim 13, where the plurality of by-product inlet holes are arranged as an array.

15. The laser welding by-product removal device of claim 13, further comprising a laser source that provides a coherent beam of light that exits the housing recess at the proximate housing end.

16. The laser welding by-product removal device of claim 15, where the peripheral sidewall comprises a tubular cross section.

* * * * *